Figure 4:
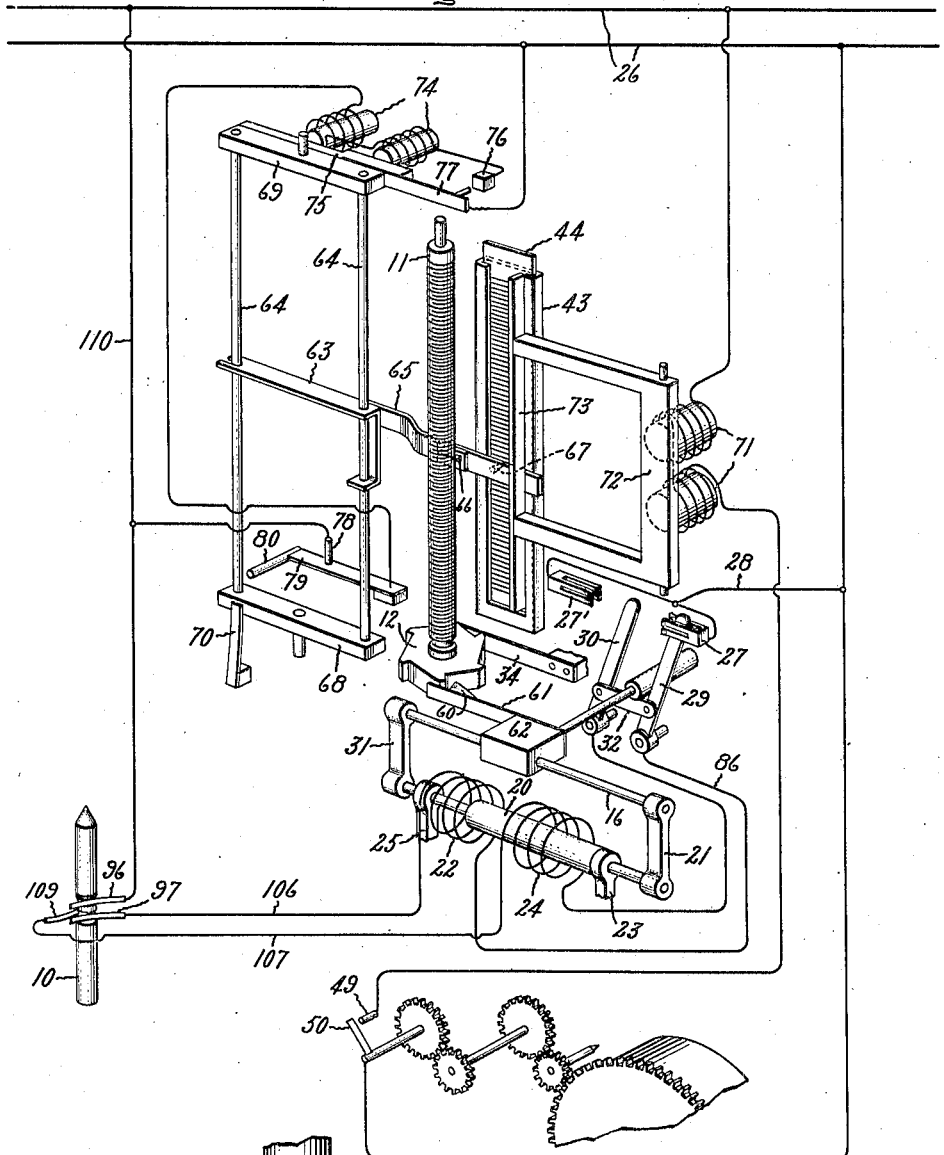

J. T. DEMPSTER.
DEMAND APPARATUS.
APPLICATION FILED DEC. 7, 1914.
1,139,169.
Patented May 11, 1915.
2 SHEETS—SHEET 1.
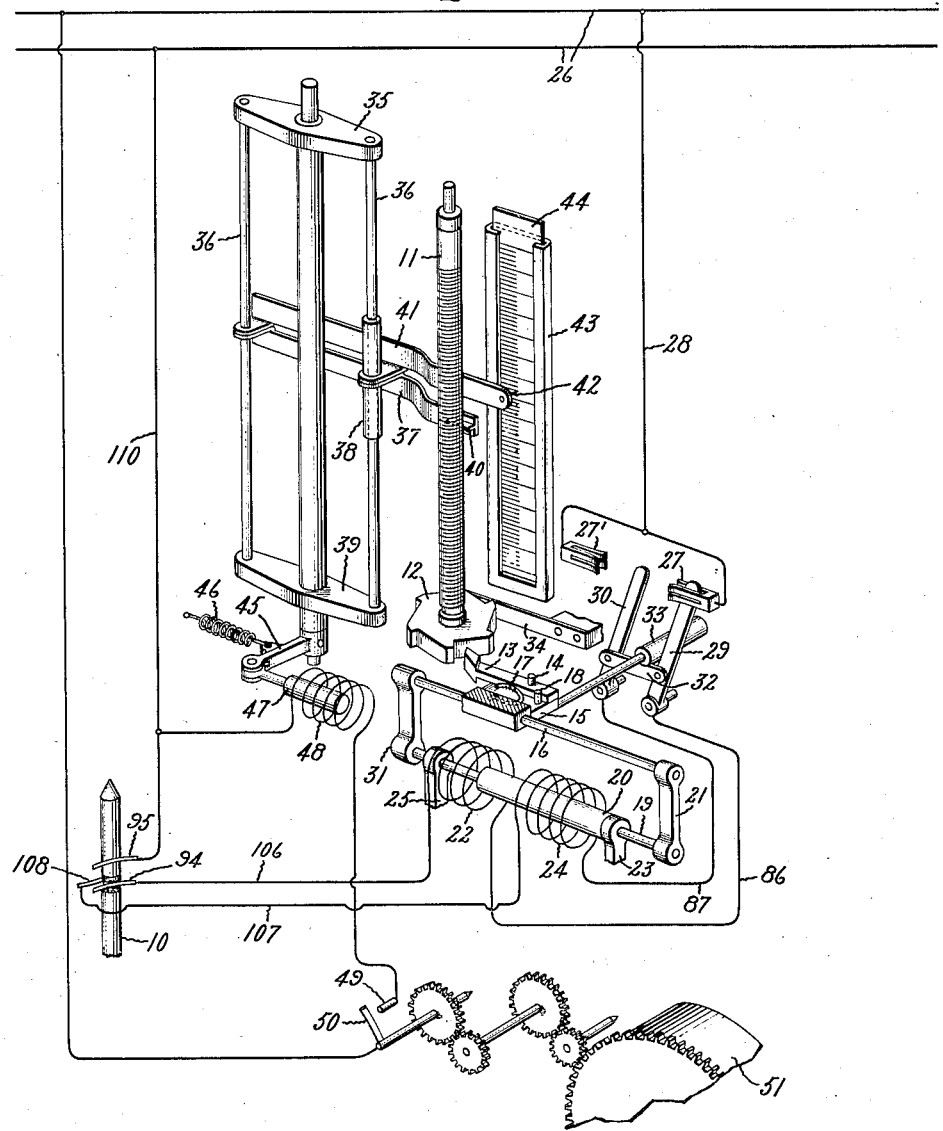
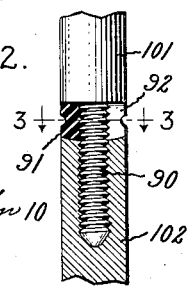
Witnesses:
George W. Tilden
J. Ellis Glen
Inventor:
John T. Dempster,
by Albert G. Davis
His Attorney.

J. T. DEMPSTER.
DEMAND APPARATUS.
APPLICATION FILED DEC. 7, 1914.

1,139,169.

Patented May 11, 1915.
2 SHEETS—SHEET 2.

Witnesses:
George H. Tilden
J. Ellis Glen

Inventor:
John T. Dempster,
by Albert G. Davis
His Attorney.

UNITED STATES PATENT OFFICE.

JOHN T. DEMPSTER, OF SCHENECTADY, NEW YORK, ASSIGNOR TO GENERAL ELECTRIC COMPANY, A CORPORATION OF NEW YORK.

DEMAND APPARATUS.

1,139,169.   Specification of Letters Patent.   Patented May 11, 1915.

Application filed December 7, 1914. Serial No. 875,802.

*To all whom it may concern:*

Be it known that I, JOHN T. DEMPSTER, a subject of the King of Great Britain, residing at Schenectady, county of Schenectady, State of New York, have invented certain new and useful Improvements in Demand Apparatus, of which the following is a specification.

My invention relates to demand apparatus, and particularly to apparatus for recording the character and magnitude of the demand made by an electrical installation upon a central generating station.

More particularly my invention relates to apparatus for recording the abnormal demands made by an electrical installation with special regard to the frequency of occurrence and the magnitude of abnormally large demands, and more especially the magnitude of the maximum demand of the installation.

A problem of particular importance in the present day distribution of electrical energy to individual consumers is to determine the tariff rate which should be charged each consumer for the energy he uses. The most logical method for determining this tariff rate consists in basing the rate upon the character and magnitude of the demand made upon the central generating station's plant by the consumer's installation. This method obviously necessitates the provision of an apparatus which will record the magnitude of the consumer's normal demand, the character of the demand, that is whether substantially constant or fluctuating, and if fluctuating the frequency of occurrence and the magnitude of the abnormal demands and in particular the abnormally large demands.

Another method of determining the tariff rate for electrical energy, which is regarded with considerable favor, consists in charging the consumer a certain contract rate for the energy used, provided the demand does not exceed a predetermined amount. If the demand at any time exceeds this predetermined amount, the consumer is penalized; the amount of the penalty depending upon the magnitude of the greatest or maximum demand made by his installation. This method requires for its successful operation an apparatus which will accurately record the greatest or maximum demand made by the consumer's installation.

A curve drawing instrument gives a substantially complete record of the consumer's demand during the time of the instrument's operation, and if properly designed for this particular purpose is the most satisfactory instrument to employ for obtaining the information necessary to determine the proper tariff rate. Since the central station is generally only particularly interested in the abnormally large demands of an electrical installation, it is evident that the larger portion of the record of the curve drawing instrument could be eliminated or greatly condensed without injuring its utility as a basis for determining tariff rates.

To this end, the object of my present invention is to provide a novel and improved construction of apparatus adapted for use in place of a curve drawing instrument for determining tariff rates and which records in a simple and convenient form the general normal demand and the abnormally large demands made by an electrical installation upon the central generating station's plant.

The object of my invention is then to provide a novel and improved form of demand apparatus, and particularly to provide an apparatus which will record the demand of an electrical installation in an accurate, satisfactory and convenient form.

A further object of my invention is to generally improve the construction and operating mechanism of demand apparatus.

Other objects of the invention will be apparent to those skilled in the art from the following specification and appended claims.

The novel features which I believe to be patentably characteristic of my invention are definitely indicated in the claims appended hereto.

Figure 5:
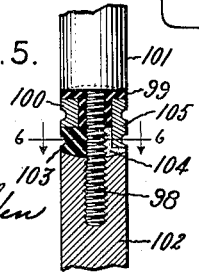
Figure 6:

The construction and mode of operation of an apparatus embodying my invention will be understood from the following description taken in connection with the accompanying drawings, in which:

Figure 1 is a diagrammatic perspective view of a demand apparatus embodying the novel features of my invention; Figs. 2 and 3 are detail views of a circuit-controlling means particularly adapted for use in this type of apparatus; Fig. 4, is a diagrammatic view in perspective of a modified construction of demand apparatus embodying my invention; and Figs. 5 and 6 are detail views of the circuit-controlling means illustrated in the apparatus of Fig. 4.

The object of penalizing a consumer when the demand of his installation exceeds a predetermined amount is ordinarily to induce him to maintain his normal energy consumption or normal demand below this predetermined amount. It is not proposed to penalize the consumer for temporary overloads or for the effects of unusual overloads of very short duration such as short circuits. Accordingly, it is always desirable in determining the demand and particularly the maximum demand to employ a substantial time interval for the measurement of the demand. The average demand of a consumer's installation may among various methods be obtained by measuring the amount of energy consumed during a predetermined time interval, or by measuring the time required to consume a predetermined quantity or interval of energy. In either case the demand is measured during each of a plurality of successive intervals of reference, whether of time or energy, and the average demand during any interval of reference is the average rate of energy consumption during that interval. In either case the time interval during which the demand is being measured should be of substantial length, that is one minute or greater. While the demand apparatus which I have illustrated in the accompany drawings is particularly designed to measure a consumer's demand in terms of the amount of energy consumed during a predetermined time interval, it will be evident to those skilled in the art that certain features of my present invention are equally applicable to an apparatus which measures the demand in terms of the time required to consume a predetermined quantity of energy.

Referring first to Fig. 1 of the drawings, there is diagrammatically represented a rotatable meter shaft 10. The meter itself forms no part of my present invention and may be any one of the well known types of motor meters. Rotation of the meter shaft 10 is transmitted by electromagnetic means to a vertically positioned screw-threaded shaft 11. The shaft 11 is pivotally mounted and in its action in the apparatus resembles the well known worm shaft. A ratchet 12 is secured to the lower end of the shaft 11 and is adapted to be driven by a pawl 13. A spring brake 34 bears against the ratchet 12 and accurately limits movement of the ratchet in response to the driving action of the pawl. The pawl 13 is pivoted at 14 to a carriage 15 secured to a rod 16. A spring 17 normally forces the pawl against a stop pin 18 secured to the carriage. A second rod 19 extends parallel to the rod 16 and has secured thereto a magnetic plunger armature member 20 coöperating with a pair of electromagnets of the solenoid type. The rods 16 and 19 are secured together by end members 21 and 31. A single electromagnetic winding of the solenoid type having two sections obtained by bringing out a common tap from the middle point of the winding or two independent solenoid windings may be employed to actuate the plunger armature 20. In the drawings I have illustrated by way of example two independent electromagnetic or solenoid windings 22 and 24. The armature 20 is so designed and related to the two windings that when current flows through the winding 22 the resulting magnetization causes the armature and the elements attached thereto to move toward the left until the armature engages a fixed stop 25, while when current flows through the winding 24 the resulting magnetization causes the armature and the elements secured thereto to move toward the right until the armature engages a fixed stop 23. The initial position of the armature 20 is determined by its engagement with the fixed stop 23, which is the position of the armature indicated in Fig. 1 of the drawings. Energization of the winding 22 causes the armature to move toward the left, whereupon the pawl 13 operatively engages the ratchet 12 and turns the shaft 11 through an angle corresponding to one tooth pitch of the ratchet. Energization of the winding 24 causes the armature to move toward the right, and thus effects the return of the armature to its initial position.

The solenoid windings are adapted to be supplied with current from direct current mains 26. The electric circuit of each winding is controlled by a circuit-closing device embodied in the shaft 10, the construction of which is illustrated in detail in Figs. 2 and 3 of the drawings. The circuit of each winding is further controlled by a switching device operatively related to the armature member 20. A conductor 106 connects the outer terminal of the winding 22 to a contact brush 94, pressing lightly against the shaft 10 in a manner hereinafter described, while a conductor 107 connects the inner terminal of the winding 24 to a similar contact brush 108 pressing lightly against the shaft 10. By reference to Figs. 2 and 3 of the drawings, it will be seen that the shaft 10 is divided into two parts 101 and 102 firmly and rigidly secured together by a screw 90. A sleeve or collar 91 of insulating material, such as ivory, bone or the like, is threaded or suitably mounted on the screw 90 and is firmly held between the abutting ends of the two parts of the shaft.

The sleeve 91 has a narrow radial slot in which is arranged a metallic contact strip 92. The sleeve and contact strip are provided with a peripheral groove 93 adapted to accommodate the contact brushes 94 and 108. A third contact brush 95 bears lightly against one of the parts of the shaft 10 and is electrically connected by a conductor 110 to one side of the mains 26. It will be understood that the metallic contact strip 92 is in good electrical contact with the parts of the shaft 10. The brushes 94 and 108 each ride in the groove 93 and are positioned on substantially diametrically opposite sides of the shaft. Thus the brushes 95 and 94 are electrically connected when the contact strip 92 moves into engagement with the brush 94, and, after the next half revolution of the shaft 10, the brushes 95 and 108 are electrically connected when the contact strip 92 moves into engagement with the brush 108. Once during each revolution of the shaft 10 the windings 22 and 24 are successively electrically connected to one side of the mains 26 by the action of the circuit-closing device on the shaft.

Two fixed spring contacts 27 and 27' are electrically connected by a conductor 28 to the other side of the mains 26 from that to which the contact brush 95 is connected. A switching device comprising two parallel switching blades or arms 29 and 30 is adapted to be moved into electrical engagement with either the contact 27 or 27' by a finger 33 preferably of insulating material secured to the carriage 15. The switch blades 29 and 30 are mechanically connected together by a link 32 of insulating material. It will thus be seen that the switch blade 29 electrically engages its coöperating contact 27 when the armature 20 engages stop 23, and that the switch blade 30 electrically engages the fixed contact 27' when the armature 20 is in contact with its coöperating fixed stop 25. The switch blade 29 is connected by a conductor 86 to the inner terminal of the solenoid winding 22, and the switch blade 30 is connected by a conductor 87 to the outer terminal of the solenoid winding 24. It will be seen that the circuit of the winding 22 is broken when the switch blade 29 is withdrawn from the fixed contact 27, while on the other hand the circuit of the winding 24 is broken when the switch blade 30 is withdrawn from the fixed contact 27'. When the armature member 20 occupies its initial position the switch blade 29 engages the contact 27, this being the position of the elements illustrated in Fig. 1 of the drawings. When the contact strip 92 bridges the two brushes 94 and 95 the circuit of the winding 22 is completed and the armature 20 is drawn toward the left until it engages the fixed stop 25. This movement of the armature throws the switch blade 30 into engagement with the fixed contact 27' and withdraws the switch blade 29 from engagement with the fixed contact 27. The next half revolution of the shaft 10 brings the contact strip 92 into engagement with the contact brush 108 thereby closing the circuit of the winding 24 and causing the armature 20 to be moved back to its initial position at the same time restoring the switch blades 29 and 30 to their respective initial positions. One revolution of the meter shaft thus causes the armature 20 and the elements attached thereto to make one complete reciprocal movement, whereby the pawl 13 operates to drive the ratchet 12 through an angle corresponding to the pitch of one ratchet tooth. This cycle of operations is repeated each time the meter shaft 10 makes one complete revolution.

The spring contact fingers of the fixed contacts 27 and 27' are so designed that their coöperating switch blades 29 and 30 respectively are withdrawn just before the armature 20 engages stops 23 or 25. The contact strip 92 is furthermore of such width that the switching device always operates to withdraw one switch blade from its contact and to throw the other switch blade into its contact before the contact strip moves out of engagement with the brush 94 or the brush 108, as the case may be, under all possible speeds of the meter shaft. The circuit of the solenoid windings 22 and 24 is thus always broken by the switching device and is never broken by the circuit-closing device on the shaft 10. The circuit-closing device on the meter shaft has very delicate contacts which would be quickly destroyed if employed to break the circuit of the solenoid windings, and hence the circuit-closing device on the meter shaft is employed only to close the circuit of the solenoid windings.

A yoke 35 having two parallel guide rods 36 is pivotally mounted in the apparatus. An actuator 37 is loosely mounted on the guide rods 36 and is biased by gravity to an initial position with the sleeve 38 resting against the base member 39 of the yoke. The actuator carries a screw-threaded member 40 adapted to engage in the screw-threads of the shaft 11, whereby rotation of the shaft in response to the driving action of the pawl 13 and ratchet 12 operates to move the actuator 37 upwardly. A recording member 41 is also loosely mounted on the guide rods 36 and is biased by gravity to a position resting on the actuator 37. The recording member 41 carries at its end a marking stylus, such as a pin point 42. A stationary frame member 43 is arranged in the path of travel of the pin point 42 and is adapted to have removably inserted therein a record sheet 44. An arm 45 is secured to the yoke 35 and has secured thereto a spring 46 which normally acts to hold the member 40 of the actuator in operative engagement with the screw-threads of the shaft 11. The magnetic plunger armature 47 of a solenoid winding 48 is secured to the arm 45, and when the solenoid winding is energized the armature operates to rock the yoke 35 and to interrupt the operative engagement of the actuator with the screw-threaded shaft 11. The circuit of the solenoid winding 48 is controlled by a pair of coöperating contacts 49 and 50. The contact 49 is fixed while the contact 50 is driven at constant speed from any suitable constant speed driving mechanism such as a clockwork 51. The contact 50 is thus time-actuated, and it therefore engages the contact 49 at equal time intervals.

The operation of the apparatus described in the preceding paragraphs is as follows. During each revolution of the meter shaft 10 the contact strip 92 successively engages each of the contact brushes 94 and 108, thereby effecting the successive energization of the solenoid windings 22 and 24. When the solenoid winding 22 is energized the armature member 20 moves toward the left and the shaft 11 is turned through an angle corresponding to the tooth pitch of the ratchet 12. The armature member 20 remains in this position until the shaft 10 completes another half revolution, when the solenoid winding 24 is energized by the engagement of the contact strip 92 with the contact brush 108 and the armature member 20 is returned to its initial position. Each time the meter shaft 10 completes one revolution the shaft 11 is, therefore, rotated by the ratchet 12 and pawl 13 through an angle corresponding to the tooth pitch of the ratchet. The spring 34 prevents overthrow of the ratchet during the driving action by the pawl. Rotation of the shaft 11 moves the actuator 37 upwardly on the guides 36. The upward movement of the actuator 37 is thus proportional to the number of revolutions made by the meter shaft and is hence a measure of the amount of energy metered. The recording member 41 is loosely mounted on the guide rods 36 and rests upon the actuator 37 and is hence moved upwardly with the actuator. At the end of a predetermined time interval the time-actuated contact 50 engages its coöperating fixed contact 49 and the winding 48 is energized, whereupon the armature 47 operates to rock the yoke 35 to interrupt the operative engagement of the actuator 37 and shaft 11 by withdrawing the member 40 from engagement with the screw-threads of the shaft. The actuator 37 immediately drops to its initial position. The rocking of the yoke 35 also forces the pin point 42 into the record sheet 44, thereby imparting to the record sheet a record of the height of the recording member at the end of the predetermined time interval. When the winding 48 is deënergized, the spring 46 rocks the yoke 35 into its normal position with the actuator 37 in operative engagement with the shaft 11 and withdraws the pin point 42 from the record sheet 44. The recording member 41 thereupon drops to its initial position resting upon the actuator 37. The engagement of the contacts 49 and 50 is maintained for a sufficient length of time to allow the actuator 37 to drop to its initial position before the solenoid winding 48 is deënergized. Since the actuator drops to its initial position substantially instantaneously upon the energizing of this winding, it will be obvious that the winding needs to be energized for only a very short time interval.

In Fig. 4 of the drawings I have shown a pawl 60 mounted on a resilient spring arm 61 and secured to a carriage 62, the latter in turn being secured to the rod 16. In the modification illustrated in this figure the actuator and recording member are combined in a unitary structure. This structure comprises a frame member 63 loosely mounted on two guide rods 64. An arm 65 is secured to the frame member 63 and carries a screw-threaded member 66 adapted to engage the screw-threads on the shaft 11 and a marking pin point 67 adapted to impart a record mark on the record sheet 44. The guide rods 64 are secured together by end members 68 and 69. A spring 70 bears against the end member 68 and normally maintains the member 66 in operative engagement with the shaft 11. A pair of electromagnets 71 have their windings connected in series and their common circuit controlled by the coöperating contacts 49 and 50. The armature 72 of these electromagnets is pivotally mounted and has secured thereto a bar 73. When the electromagnets 71 are energized the armature 72 moves the bar 73 into engagement with the outer end of the arm 65 thereby causing the pin point 67 to impart a record mark on the record sheet 44 and simultaneously interrupting the operative engagement of the member 66 with the shaft 11. A pair of electromagnets 74 have a coöperating armature 75 secured to the upper end member 69, and while these electromagnets are energized the member 66 is maintained operatively disengaged from the shaft 11. The circuit of the windings of the electromagnets 74 includes a pair of coöperating contacts 76 and 77 and a second pair of coöperating contacts 78 and 79. The contacts 78 and 79 are normally closed, and are only open when the frame member 63 occupies its initial position resting upon the lower end member 68. Contact 76 is stationary while its coöperating contact 77 is secured to the end member 69. When the electromagnets 71 are energized the guide rods 64 are rocked and the contact 77 is moved into engagement with the contact 76, whereby the circuit of the electromagnets 74 is completed and the member 66 is held out of operative engagement with the shaft 11. As soon as the electromagnets 71 are deenergized the bar 73 moves away from the arm 65 and the pin point 67 withdraws from the record sheet 44. The actuator then responding to the action of gravity returns to its initial position. Just before reaching its initial position the frame member 63 of the actuator strikes a pin 80 secured to the movable contact 79, and this contact is thereupon withdrawn from engagement with its coöperating fixed contact 78. The circuit of the electromagnets 74 is thereby opened and the spring 70 forces the member 66 again into operative engagement with the shaft 11. It will be evident, however, that positive means are provided for maintaining the actuator and the shaft disengaged until the actuator has returned to its initial position.

The contact 77 is more or less resilient and is so designed that when held in normal engagement with its coöperating contact 76 by the energization of the electromagnets 74, the armature 75 is separated from the poles of the electromagnets 74 by a small air gap and so that the pin point 67 is just out of engagement with the record sheet. The action of the bar 73 upon the energization of the electromagnets 71 is to place the contact 77 under a slight tension so that the width of the air gap between the armature 75 and the poles of the electromagnets 74 is slightly less than when the magnets 71 are deënergized, whereby the pin point 67 is forced into the record sheet. When the electromagnets 71 are deënergized the resiliency of the contact 77 acts to withdraw the pin point from the record sheet and permits the unobstructed passage of the actuator 63 and the arm 65 to their initial positions.

In Figs. 4, 5 and 6 of the drawings, I have shown a modified form of circuit-closing device embodied in the shaft 10. This device comprises three contact brushes 96, 97 and 109 corresponding to the contact brushes 95, 94 and 108 respectively of the device illustrated in Fig. 1. The shaft 10 is here also divided into two parts 101 and 102 rigidly secured together by a screw 98. A bushing or hub 99 of insulating material surrounds the screw 98 and abuts the end of the part 101 of the shaft. A metallic collar 100 is mounted on the hub 99 and is insulated thereby both from the shaft and the screw. A washer 103 of insulating material separates the collar 100 from the end of the other part 102 of the shaft 10. The collar 100 and the washer 103 are each provided with a peripheral groove to accommodate the contact brushes. The washer 103 has a narrow radial slot 104 into which extends a projection 105 of the collar 100. The projection 105 serves as a contact strip to bridge the contacts 96 and 97 or 96 and 109, as the case may be. To this end the contact brush 96 rides in the groove of the metallic collar 100, while contact brushes 97 and 109, positioned on diametrically opposite sides of the shaft 10, ride in the groove of the washer 103. When either brush 97 or 109 engages the projection 105 electrical contact is made between that brush and the other brush 96, as will be readily understood. During each revolution of the shaft 10 the contact brushes 96 and 97 and the contact brushes 96 and 109 are thus successively bridged by the projection or contact strip 105 and the windings 22 and 24 successively energized. The operation of the circuit-closing device, the switching device and the transmission of the motion of the meter shaft 10 to the rotatable screw-threaded shaft 11 are substantially the same in the apparatus of Fig. 4 as explained in connection with the apparatus of Fig. 1. It will be evident, however, that the brushes 96, 97 and 109 are always insulated from the meter shaft 10 and hence the shaft is neither alive nor grounded.

The record sheet 44 may be of any suitable material upon which a prick mark can be impressed by the pin point of the marking stylus. It will be understood that I do not desire to limit myself to the particular means of recording herein illustrated and described. I have, accordingly, employed the phrase record sheet in the appended claims to cover any device upon which a record may be made. The record sheet 44 is removably positioned in the frame member 43 so that a renewal of the record sheet may be made when desired.

The prick marks on the record sheet indicate the demand of the electrical installation in a simple and convenient form. At the end of each equal time interval a prick mark is made on the record sheet and its height is a measure of the amount of energy consumed and metered during the preceding time interval. The prick marks thus indicate the amounts of energy consumed and metered during a plurality of equal time intervals of a substantial length or duration. In the case of the ordinary electrical installation, the majority of the prick marks will be made on the record sheet at about the same position. This congested portion of the record sheet indicates the magnitude of the normal demand. The prick marks at the top of the record sheet indicate the abnormally large demands, and it is in these demands that the central station management is most particularly interested. It will be evident that the maximum demand is indicated by the prick mark nearest the top of the record sheet. The probability of the equality of abnormal demands is such that there is likely to be few, if any, coincident prick marks in the upper portion of the record sheet. For this reason it is possible to obtain from the record sheet a substantially accurate and correct record of the abnormal demands of the installation, both as to the frequency of occurrence and the magnitude of such demands.

It will be readily understood by those skilled in the art that the demand apparatus of my present invention may be used if desired to measure the demand of an electrical installation in terms of the time required to consume a predetermined quantity of energy. When the apparatus is employed in this manner the contacts 94 and 95 or 96 and 97, as the case may be, will be electrically in engagement at equal time intervals. The contacts 49 and 50 will in this case be controlled by the rotatable shaft of the meter, and will be closed at equal intervals of metered energy.

I have explained my invention by illustrating and describing certain specific embodiments thereof, but it will be readily understood by those skilled in the art that the invention may be embodied in many other forms than that shown and described. I, accordingly, do not wish to be restricted to the particular forms or constructions disclosed herein by way of example for the purpose of setting forth my invention in accordance with the patent statutes. The terms of the appended claims are, therefore, not restricted to the precise structures disclosed, but are intended to cover all changes and modifications within the spirit and scope of my invention.

What I claim as new and desire to secure by Letters Patent of the United States, is:—

1. A demand apparatus comprising in combination a rotatable shaft, an actuator, a reciprocating member adapted to drive said actuator only when moved in one direction, electromagnetic means controlled by said shaft for moving said member in the direction to drive said actuator, and additional electromagnetic means for moving the member in the opposite direction.

2. A demand apparatus comprising in combination a rotatable shaft, an electric circuit including circuit-closing means operatively related to said shaft, an actuator, electromagnetic means included in said circuit, an armature having an initial position and adapted to be moved therefrom and to drive said actuator upon the energization of said electromagnetic means, and electromagnetic means for returning the armature to its initial position.

3. A demand apparatus comprising in combination a rotatable shaft, a driving member, a ratchet secured to said driving member, a reciprocating pawl operatively related to said ratchet, electromagnetic means controlled by said shaft for moving said pawl in the direction to drive said ratchet, and electromagnetic means also controlled by said shaft for moving the pawl in the opposite direction.

4. A demand apparatus comprising in combination a rotatable shaft, an actuator, a reciprocating member adapted to drive said actuator when moved in one direction only, electromagnetic means for moving said member in the direction to drive said actuator and for moving said member in the opposite direction, main circuit-controlling means operatively related to said shaft for closing the circuits of said electromagnetic means, and auxiliary circuit-controlling means operatively related to said member for opening the circuits of said electromagnetic means.

5. A demand apparatus comprising in combination a rotatable shaft, an actuator, a reciprocating member adapted to drive said actuator when moved in one direction only, electromagnetic means for moving said member in the direction to drive said actuator, main circuit-controlling means operatively related to said shaft for closing the electric circuit of said electromagnetic means, and auxiliary circuit-controlling means operatively related to said member for breaking the circuit of said electromagnetic means.

6. A demand apparatus comprising in combination a rotatable shaft, an actuator, a reciprocating member adapted to drive said actuator when moved in one direction, an electromagnetic element adapted when energized to move said member in the direction to drive said actuator, a second electromagnetic element adapted when energized to move said member in the opposite direction, circuit-closing means operatively related to said shaft for successively closing the circuits of said electromagnetic elements, and circuit-opening means independent of said circuit-closing means operatively related to said member for successively opening the circuits of said electromagnetic elements.

7. A demand apparatus comprising in combination a rotatable shaft, an actuator, a pair of electromagnetic elements, an armature member for said elements operatively related to said actuator and arranged to be moved in one direction upon the energization of one of said elements and in the other direction upon the energization of the other element, circuit-closing means operatively related to said shaft and included in the electric circuits of each of said electromagnetic elements, and means independent of said circuit closing means for opening the circuits of each of said electromagnetic elements.

8. A demand apparatus comprising in combination a rotatable shaft, an actuator, a reciprocating member having an initial position and adapted to drive said actuator when moved from such initial position, electromagnetic means adapted when energized to move said member from its initial position to drive said actuator, circuit-closing means operatively related to said shaft and included in the electric circuit of said electromagnetic means, a second electromagnetic means adapted when energized to return said member to its initial position, means for controlling the electric circuit of said second electromagnetic means, and means for opening the electric circuit of said first mentioned electromagnetic means when said member is moved from its initial position.

9. A demand apparatus comprising in combination a rotatable shaft, an actuator, a reciprocating member adapted to drive said actuator when moved in one direction, electromagnetic means for moving said member in the direction to drive said actuator, electromagnetic means for moving said member in the opposite direction, circuit-closing means operatively related to said shaft and adapted to successively close the circuits of said electromagnetic means, and means operatively related to said member for opening the circuit of each of said electromagnetic means after said circuit closing means has operated to close the circuit.

10. A demand apparatus comprising in combination a rotatable shaft, an actuator, a reciprocating member adapted to drive said actuator when moved in one direction, electromagnetic means for moving said member in the direction to drive said actuator, electromagnetic means for moving said member in the opposite direction, circuit-closing means operatively related to said shaft and adapted to successively close the circuits of said electromagnetic means, and a switching device operatively related to said movable member and adapted to open the circuit of that electromagnetic means last energized by the action of said circuit-closing means and to close the circuit of that electromagnetic means to be next energized by the action of said circuit-closing means.

11. A demand apparatus comprising in combination a rotatable meter shaft, a rotatable screw-threaded shaft operatively related to said meter shaft, an actuator having a normally biased initial position and adapted to operatively engage said screw-threaded shaft, a recording member independent of said actuator having a normally biased initial position and adapted to be moved by said actuator across a suitable record sheet, and means for intermittently causing said recording member to impart a record mark on said record sheet and for interrupting the operative engagement of said actuator and said screw-threaded shaft whereby said actuator returns to its initial position.

12. A demand apparatus comprising in combination a rotatable meter shaft, a rotatable screw-threaded shaft operatively related to said meter shaft, an actuator having an initial position and adapted to operatively engage said screw-threaded shaft, a recording member independent of said actuator and adapted to be moved thereby, means for intermittently interrupting the operative engagement of said actuator and said screw-threaded shaft, and means whereby said actuator returns to its initial position each time the operative engagement of said actuator and said screw-threaded shaft is interrupted.

13. A demand apparatus comprising in combination a driving member, an actuator having a reciprocatory straight-line motion biased to an initial position and normally maintained in operative engagement with said driving member, a recording member having a reciprocatory straight-line motion biased to an initial position and adapted to be moved by said actuator, said recording member and said actuator being arranged to independently return to their respective initial positions, a stationary record sheet operatively related to said recording member, and means operating at the end of each of a number of intervals of a greater time duration than one minute for causing said recording member to impart a record mark on said record sheet and to interrupt the operative engagement of said actuator and said driving member thereby permitting the actuator to return to its initial position.

14. A demand apparatus comprising in combination a rotatable meter shaft, a rotatable screw-threaded shaft operatively related to said meter shaft, an actuator having a normally biased initial position and adapted to operatively engage said screw-threaded shaft, a recording member independent of said actuator having a normally biased initial position and adapted to be moved by said actuator, a stationary frame member arranged in the path of travel of said recording member, a record sheet in said frame member, and means for intermittently causing said recording member to impart a record mark on said record sheet and for interrupting the operative engagement of said actuator and said screw-threaded shaft whereby said actuator returns to its initial position.

15. A demand apparatus comprising in combination a driving member, a guide rod, an actuator loosely mounted on said rod and biased to an initial position, means whereby said actuator is normally held in engagement with said driving member, a recording member independent of said actuator and adapted to be moved thereby, and means for rocking said guide rod to interrupt the operative engagement of said actuator and said driving member thereby permitting the actuator to return to its initial position.

16. A demand apparatus comprising in combination a driving member, a guide rod, an actuator loosely mounted on said rod and biased to an initial position, means whereby said actuator is normally held in engagement with said driving member, a recording member also biased to an initial position and adapted to be moved by said actuator, a record sheet operatively related to said recording member, and means for intermittently rocking said guide rod to cause said recording member to impart a record mark on said record sheet and to interrupt the operative engagement of said actuator and said driving member thereby permitting the actuator to return to its initial position.

17. A demand apparatus comprising in combination a driving member, a guide rod, an actuator loosely mounted on said rod and biased by gravity to an initial position, means whereby said actuator is normally held in engagement with said driving member, a recording member also loosely mounted on said rod and biased by gravity to an initial position and adapted to be moved by said actuator, a record sheet operatively related to said recording member, and means for intermittently rocking said guide rod to cause said recording member to impart a record mark on said record sheet and to interrupt the operative engagement of said actuator and said driving member thereby permitting the actuator to return to its initial position.

18. A demand apparatus comprising in combination a rotatable screw-threaded shaft, a pivotally mounted yoke having two parallel guide rods, an actuator mounted on said guide rods and biased to an initial position, means whereby said actuator is normally held in operative engagement with said shaft, a recording member adapted to be moved by said actuator, and means for rocking said yoke to interrupt the operative engagement of said actuator and said shaft thereby permitting the actuator to return to its initial position.

19. A demand apparatus comprising in combination a rotatable screw-threaded shaft, a pivotally mounted yoke having two parallel guide rods, an actuator mounted on said guide rods and biased to an initial position, means whereby said actuator is normally held in operative engagement with said shaft, means for rocking said yoke to interrupt the operative engagement of said actuator and said shaft thereby permitting the actuator to return to its initial position, and positive means for maintaining said actuator and said shaft operatively disengaged until the actuator has returned to its initial position.

20. A demand apparatus comprising in combination a rotatable screw-threaded shaft, a pivotally mounted yoke having two parallel guide rods, an actuator mounted on said guide rods and biased to an initial position, means whereby said actuator is normally held in operative engagement with said shaft, a recording member mounted on said guide rods and adapted to be moved by said actuator, a record sheet operatively related to said recording member, and means for rocking said yoke to cause said recording member to impart a record mark on said record sheet and to interrupt the operative engagement of said actuator and said shaft thereby permitting the actuator to return to its initial position.

21. A demand apparatus comprising in combination a rotatable screw-threaded shaft, a pivotally mounted yoke having two parallel guide rods, an actuator loosely mounted on said guide rods and biased by gravity to an initial position, means whereby said actuator is normally held in operative engagement with said shaft, a recording member loosely mounted on said guide rods above said actuator and adapted to be moved thereby, and means for rocking said yoke to interrupt the operative engagement of said actuator and said shaft thereby permitting the actuator to return to its initial position.

22. A demand apparatus comprising in combination a rotatable screw-threaded shaft, a pivotally mounted yoke having two parallel guide rods, an actuator loosely mounted on said guide rods and biased by gravity to an initial position, means whereby said actuator is normally held in operative engagement with said shaft, a recording member also loosely mounted on said guide rods above said actuator and biased by gravity to an initial position and adapted to be moved by said actuator, a record sheet operatively related to said recording member, and means for rocking said yoke to cause said record member to impart a record mark on said record sheet and to interrupt the operative engagement of said actuator and said shaft thereby permitting the actuator to return to its initial position.

23. A demand apparatus comprising in combination a rotatable meter shaft, a rotatable screw-threaded shaft, electromagnetic means for transmitting rotation of said meter shaft to said screw-threaded shaft, a pivotally mounted yoke having two parallel guide rods, an actuator loosely mounted on said guide rods and biased to an initial position, means whereby said actuator is normally held in operative engagement with said shaft, a recording member also loosely mounted on said guide rods above said actuator and biased by gravity to an initial position and adapted to be moved by said actuator, a record sheet operatively related to said recording member, and electromagnetic means including a time-actuated circuit operating device for rocking said yoke to cause said recording member to impart a record mark on said record sheet and to interrupt the operative engagement of said actuator and said shaft thereby permitting the actuator to return to its initial position.

In witness whereof, I have hereunto set my hand this 4th day of December 1914.

JOHN T. DEMPSTER.

Witnesses:
HELEN ORFORD,
MARGARET E. WOOLLEY.